US006604870B2

United States Patent
Hørlyck

(10) Patent No.: US 6,604,870 B2
(45) Date of Patent: Aug. 12, 2003

(54) METHOD AND AN AMPLIFIER UNIT FOR THE TRANSMISSION OF DATA SIGNALS VIA AN OPTICAL FIBER

(75) Inventor: Henrik Hørlyck, Charlottenlund (DK)

(73) Assignee: Tellabs Denmark A/S, Ballerup (DK)

( * ) Notice: Subject to any disclaimer, the term of this patent is extended or adjusted under 35 U.S.C. 154(b) by 0 days.

(21) Appl. No.: 09/917,121

(22) Filed: Jul. 27, 2001

(65) Prior Publication Data

US 2002/0027687 A1 Mar. 7, 2002

Related U.S. Application Data

(63) Continuation of application No. 09/194,788, filed as application No. PCT/DK97/00240 on May 30, 1997, now Pat. No. 6,285,480.

(30) Foreign Application Priority Data

May 31, 1996 (DK) ................................ 0619/96

(51) Int. Cl.[7] .................. H04J 14/02; H04B 10/08; H04B 10/02; H04B 10/04
(52) U.S. Cl. ...................... 398/82; 398/33; 398/35; 398/177; 398/183
(58) Field of Search .................. 359/134, 135, 359/136, 110, 179, 184, 160, 177, 181

(56) References Cited

U.S. PATENT DOCUMENTS 5,383,046 A   1/1995   Tomofuji et al.
5,440,418 A   8/1995   Ishimura et al.
5,535,037 A   7/1996   Yoneyama
5,737,118 A   4/1998   Sugaya et al.
5,784,192 A   7/1998   Sugiyama et al.

FOREIGN PATENT DOCUMENTS

FR   2712096        5/1995
GB   WO 96/20545  * 7/1996   ............ H04J/14/08

* cited by examiner

Primary Examiner—Leslie Pascal
Assistant Examiner—Dalzid Singh

(57) ABSTRACT

A method of transmitting data signals via an optical fiber between two network elements (14, 36, 43, 56) in a digital data transmission network comprises using a transmission protocol, wherein, in addition to said data signals, first control and/or monitor signals in the form of overhead signals are transmitted. An optical fiber amplifier (23) is inserted in the optical fiber between the two network elements. Additionally, second control and/or monitor signals in a format corresponding to said overhead signals are transferred between the optical fiber amplifier and at least one of the two network elements. An amplifier unit (22, 48) comprising an optical fiber amplifier (23) is adapted to be inserted in an optical fiber for the transmission of data signals between two network elements (14, 36, 43, 56) in such a data transmission network. The unit moreover comprises means to transfer second control and/or monitor signals in a format corresponding to said overhead signals between the unit and at least one of the two network elements.

19 Claims, 3 Drawing Sheets

METHOD AND AN AMPLIFIER UNIT FOR THE TRANSMISSION OF DATA SIGNALS VIA AN OPTICAL FIBER

RELATED APPLICATIONS

This application is a continuation of U.S. application Ser. No. 09/194,788 filed Aug. 13, 1999, now U.S. Pat. No. 6,285,480, B1 which claims priority to as a 371 of PCT Application No. PCT/DK97/00240 filed May 30, 1997 from Denmark Application No. 0619/96 filed May 31, 1996.

TECHNICAL FIELD OF THE INVENTION

The invention concerns a method of transmitting data signals via an optical fiber between two network elements in a digital data transmission network, wherein, in addition to said data signals, first control and/or monitor signals are transmitted for the administration of the network, and wherein the optical fiber amplifier is inserted in the optical fiber between the two network elements. The invention moreover concerns an amplifier unit for use in such a data transmission network.

BACKGROUND OF THE INVENTION

Today, optical fibers are extensively used in teletransmission networks. However, a drawback is that attenuation puts a limit to the length of the fibers that can be used. This circumstance has been improved considerably by the development of optical fiber amplifiers, which are purely optical components that are introduced into a fiber, and perform optical amplification of the light which passes through it. Very long fiber lengths can be obtained hereby, as fiber amplifiers, so to speak, replace traditional electrical regenerators or repeaters.

Traditional regenerators in a transmission network, i.e., regenerators where the optical signals are converted into electrical signals, and are amplified and converted again into optical signals, and are usually monitored by transferring a plurality of monitoring signals between each regenerator and its adjacent network elements in the network. Owing to operational reliability, it is desired to monitor the optical fiber amplifiers for the same reason in the same manner.

However, in most transmission systems, such as e.g., SDH or SONET, the monitoring signals are transferred in so-called overhead bytes which are embedded among the other data in the data blocks of the transmission protocols. The signals are therefore accessible only when the data blocks "are packed out", as is done, or at any rate may be done, in the traditional electrical regenerators. This, however, is not possible in an optical fiber amplifier, since this merely optically amplifies the light passing through it and therefore has no access to individual bytes in the data flow.

Systems are known wherein separate and special monitoring signals can be transmitted via the fiber or in another manner to or from such optical fiber amplifiers. However, these special signals require special equipment at the fiber amplifiers, as well as at the adjacent network elements. Further, these signals cannot readily be incorporated in the general monitoring system of the network, which, as mentioned, can take place e.g., by means of the overhead bytes of the transmission system. The monitoring of the optical fiber amplifiers will therefore be rather complex.

FR 2 712 096 discloses a system in which control signals can be modulated to the output signal of an optical amplifier. However, monitoring signals proper are not involved.

A system of the type described above with separate and special monitoring signals via the fiber is disclosed in U.S. Pat. No. 5,383,046. The monitoring signals are amplitude modulated on the data signals passing the fiber amplifier. These signals do not have a format allowing them to be incorporated in the general monitoring system of the network because they are transmitted as special signals to the subsequent regenerator proper and only then incorporated into the SDH system.

SUMMARY OF THE INVENTION

Accordingly, an object of the invention is to provide a method and an amplifier unit enabling relatively simple monitoring of such fiber amplifiers, and allowing said monitoring to be incorporated directly in the general monitoring system of the network.

This is achieved according to the invention by a method wherein said control and/or monitor signals are transferred between the optical fiber amplifier and at least one of the two network elements in a format corresponding to said overhead signals.

When signals of this format are transferred to or from the fiber amplifier, these signals in the adjacent network elements may be directly incorporated in the general monitoring system, It will therefore be possible to monitor the fiber amplifiers in quite the same manner as if they had been traditional electrical regenerators.

It will be expedient that said second control and/or monitor signals are transferred between the optical fiber amplifier and said network element via an optical fiber, and preferably via the optical fiber in which the optical fiber amplifier is inserted.

If said second control and/or monitor signals are transferred without changing said data signals and first control and/or monitor signals, a system is provided wherein the overall monitoring system has access to all signals as they were before the insertion of the fiber amplifier.

An expedient embodiment is achieved when said second control and/or monitor signals are transferred by means of special optical transmitter/receiver units placed at the optical line amplifier and said network element, respectively.

Said second control and/or monitor signals may e.g. be transferred in the fiber as optical signals having a wavelength which is different from the wavelength of said data signals and first control and/or monitor signals. This ensures that the signals do not interfere with the other optical signals in the fiber. It is a simple operation to separate the signals from the other signals on the receiver side.

Alternatively, said second control and/or monitor signals may be transferred in the fiber by modulation of a carrier wave, which is also used for the transfer of said data signals and first control and/or monitor signals. This method requires a little more complex equipment; but, on the other hand, it does not occupy additional bandwidth in the fiber, which is of importance particularly in networks of much traffic where it is desired to have a bandwidth as large as possible at disposal for the data traffic proper.

The method may be used particularly in a data transmission network which is designed as a Synchronous Digital Hierarchy (SDH), and said second control and/or monitor signals may then be formed on the basis of one or more of the overhead bytes used in SDH. Preferably, one or more of the overhead bytes marked D1–D12 may be used.

As mentioned, the invention also concerns an amplifier unit having an optical fiber amplifier and adapted to be inserted in an optical fiber between two network elements in a digital data transmission network, as described above.

When the unit is adapted to transmit/receive second control and/or overhead signals in a format corresponding to said overhead signals, then, as mentioned before, the signals in the adjacent network elements may be incorporated directly in the general monitoring system in quite the same manner as if it had been traditional electrical regenerators.

An expedient embodiment of the amplifier unit is adapted to receive and/or transmit said second control and/or monitor signals via the optical fiber in which the optical fiber amplifier is inserted.

Likewise, the amplifier unit may be adapted to be used in a data transmission network designed as a Synchronous Digital Hierarchy (SDH), and to allow the second control and/or monitor signals to be formed on the basis of one or more of the overhead bytes used in SDH. In particular, it may preferably be adapted to use one or more of the overhead bytes marked D1–D12.

When the amplifier unit comprises a local control unit which is adapted to generate said second control and/or monitor signals on the basis of the state of the optical fiber amplifier, and/or to control the optical amplifier on the basis of received said second control and/or monitor signals, it is ensured that the amplifier unit may be viewed externally in quite the same manner as a traditional electrical regenerator.

The amplifier unit may e.g., comprise means to separate light having a specific wavelength from the optical signal received via said fiber, and to convert the separated light into said second control and/or monitor signals. Alternatively, it may comprise means to demodulate signals which are modulated on the optical signal received from said fiber, and to convert these into said second control and/or monitor signals.

Correspondingly, the amplifier unit may e.g., comprise means to convert said second control and/or monitor signals into an optical signal having a wavelength which is different from wavelengths occurring in the optical signals amplified by the optical fiber amplifier, and means to multiplex said optical signal with the amplified optical signals. Alternatively, it may comprise means to modulate said second control and/or monitor signals on the optical signals amplified by the optical fiber amplifier. In the latter case, the modulating means may expediently be adapted to modulate a pump laser current to the optical fiber amplifier.

The advantages of separate wavelength and modulation, respectively, are described above.

BRIEF DESCRIPTION OF THE DRAWINGS

The invention will be explained more fully below with reference to the drawings, in which.

DETAILED DESCRIPTION OF THE INVENTION

Figure 1:
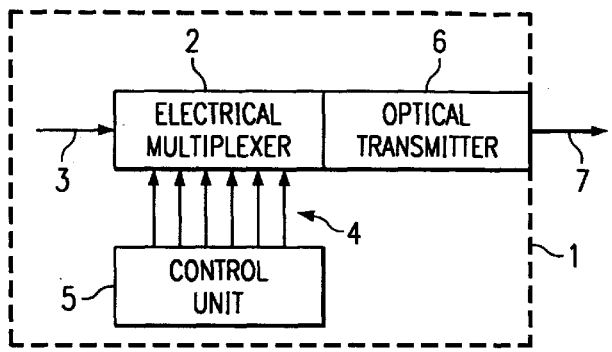
FIG. 1 shows an output part of a known network element.

FIG. 1 shows the output part 1 of a traditional and known network element (such as e.g. a terminal multiplexer) for a teletransmission system of the type in which the invention may be applied. The output part 1 can convert data signals 3 into optical signals 7 and transmit them via an optical fiber to an adjacent network element.

A control unit 5 generates a plurality of control and/or monitor signals 4 which, together with the data signals, are transferred to the adjacent network element. These signals are used i.e. for monitoring the function of the network elements. The control and monitor signals 4 are interleaved, as overhead signals, with the data signals 3 in the electrical multiplexer 2, and they are then converted in the optical transmitter unit 6 into the optical signals 7 which are transferred via the fiber to the adjacent network element. The nature of this interleaving depends on the employed transmission protocol, which determines strict formats therefor. An example will be described below.

For clarity, optical signals are shown as arrows in a thick black line in FIG. 1 and the following figures, while arrows of ordinary line thickness represent electrical signals.

Figure 2:
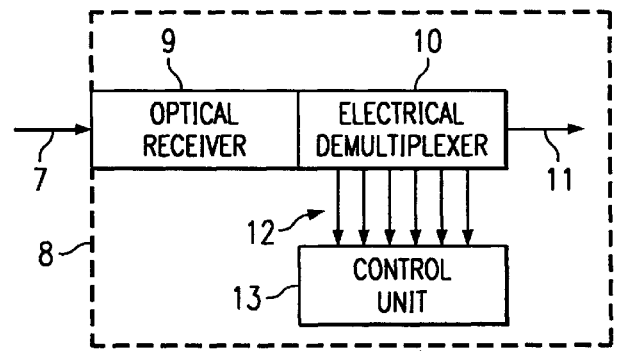
FIG. 2 shows an input part of a known network element.

FIG. 2 similarly shows the input part 8 of an adjacent network element. Here, the optical signals 7, which arrive via the optical fiber from the output part shown in FIG. 1, are received in the optical receiver unit 9, in which they are converted into electrical signals which are split in the demultiplexer 10 into the data signals 11 and the control and monitor signals 12 for the control unit 3. The data signals 11 correspond to the data signals 3 in FIG. 1, and the control and monitor signals 12 correspond to the signals 4.

In the situation shown in FIGS. 1 and 2, the optical signals are transmitted via an optical fiber from the output part 1 in one network element to the input part 8 in another network element, which means that the optical fiber transfers light in one direction only. This will also frequently be the case in practice, as signals in the opposite direction can then be transmitted via a second fiber which is arranged in parallel with the first one. However, it should be noted that, of course, it is possible to use the same fiber for the transmission of optical signals in both directions. In that case, the fiber will be connected at both ends to a combined input/output part capable of both transmitting and receiving optical signals and keeping these mutually separate. The mode of operation will be the same as described above.

Said network elements will normally be incorporated in a larger teletransmission network, and the optical signals between the individual network elements may e.g. be transmitted in the fiber by means of a digital transmission system of the Synchronous Digital Hierarchy (SDH) type. The SDH system has channels incorporated in its data structure to control and monitor the network and the individual network elements. The data channels to operate and maintain the network are embedded in the actual SDH signals and are therefore accessible in the SDH network elements in which the signals are "packed out".

The basic data structure of an SDH system is an STM-1 frame which consists of 9 rows having 270 bytes each. Of these, the first 9 bytes in each row of the system are used for said data channels to control and monitor the network, and they are also called overhead information. Three of these bytes (D1–D3) are used for controlling and monitoring regenerators on an SDH line, while 9 other bytes (D4–D12) are similarly used for controlling and monitoring multiplexers on an SDH line.

The control and monitor signals 4 and 12 shown in FIGS. 1 and 2 will be formed i.e. by said bytes D1–D12 in an SDH system, the control unit 5 calculating the bytes concerned and transmitting them, as described above, via the optical fiber to the control unit 13 of the receiver.

If one or more optical fiber amplifiers are inserted in the optical fiber which transfers the optical signals between e.g. two terminal multiplexers, the optical signals, i.e. also the overhead signals, will pass unchanged from one terminal multiplexer through the fiber amplifiers to the other terminal multiplexer. Thus, it is not possible to add or remove overhead signals in the fiber amplifiers, as these just purely optically amplify the light which passes them.

Figure 3:
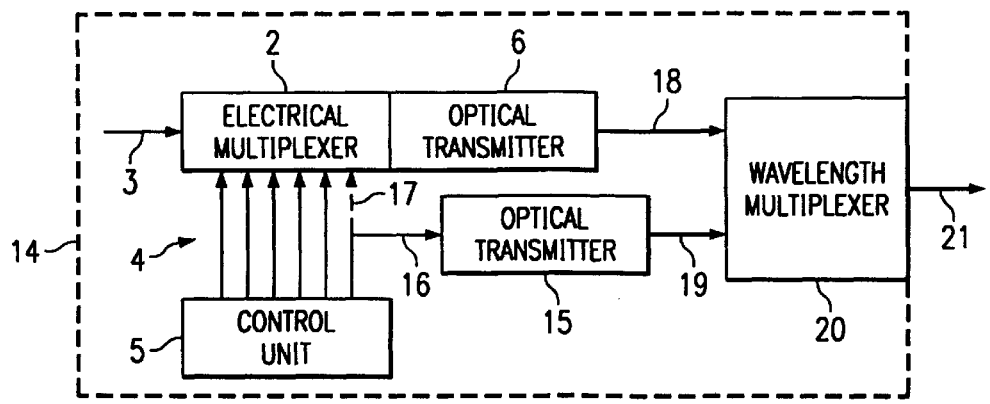
FIG. 3 shows an output part of a network element according to a first embodiment of the invention.

However, it is also expedient to be able to monitor the fiber amplifiers, and the invention therefore teaches how to do this by means of special optical signals which are transferred to and from the fiber amplifier. FIG. 3 thus shows an output part 14, modified according to the invention, for e.g. a terminal multiplexer which, in addition to the components shown in FIG. 1, has a further optical transmitter unit 15 and an optical multiplexer 20. The control and monitor signals 4 generated in the control unit 5 are fed to the multiplexer 2 like before, in which they are interleaved with the data signals 3 and are converted in the optical transmitter unit 6 into optical signals 18 corresponding to the optical signals 7 in FIG. 1. Some control and monitor signals 16, which may be the above-mentioned bytes D1–D12 in an SDH system and which are to be transferred to the fiber amplifier, are moreover fed to the further optical transmitter unit 15, in which they are converted into optical signals 19 having another wavelength than the optical signals 18. If the optical signals 18 already consist of light having several different wavelengths, the optical signals 19 will have a wavelength which is not included in the signals 18.

In the optical wavelength multiplexer 20, the optical signals 18 and 19 are mixed to form the optical signal 21 which is then transmitted on the optical fiber. The multiplexer 20 may be a simple optical component which merely adds up the signals 18 and 19.

As appears from the dashed arrow 17, the control signals (D1–D12) concerned may be fed to the multiplexer 2 as well as the transmitter unit 15, as described above, or they may fed just to the transmitter unit 15. The two situations will be described later.

Figure 4:
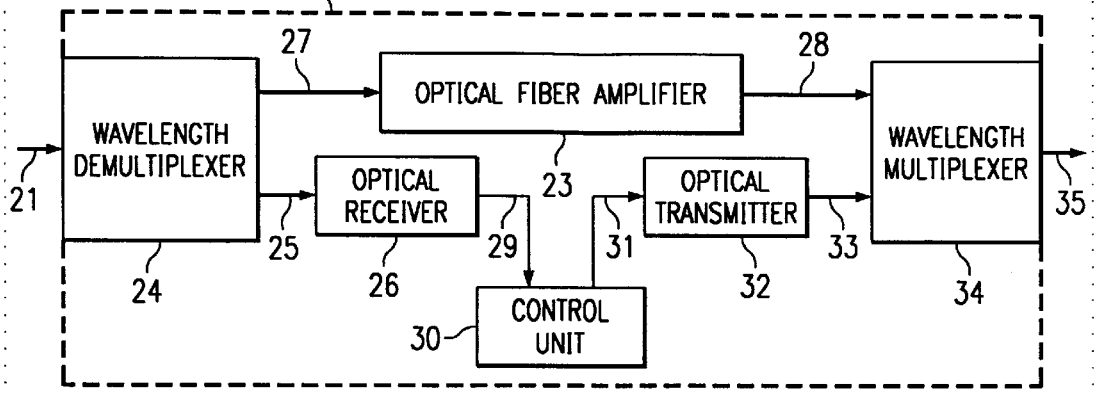
FIG. 4 shows an optical amplifier unit according to a first embodiment of the invention.

FIG. 4 shows how an optical amplifier unit 22 having a fiber amplifier 23 and associated control circuits may be built. The optical signal 21 from the optical fiber first passes the wavelength demultiplexer 24, which splits it so that light having a wavelength corresponding to the wavelength of the optical signal 19 in FIG. 3 is fed as the optical signal 25 to an optical receiver unit 26, while other wavelengths are fed as the optical signal 27 directly to the actual optical fiber amplifier 23 which amplifies the signal purely optically. Thus, the optical signal 28 on the output of the fiber amplifier 23 is just an amplified version of the signal 27. The branched optical signal 25 is converted in the receiver unit 26 into an electrical control and monitor signal 29, which corresponds to the signal 16 in FIG. 3 and may thus be formed by said bytes D1–D12 in an SDH system. This signal is fed to a local control unit 30 where it may form part of the control of the fiber amplifier.

It is thus possible to transfer control and monitor signals in the described manner from a traditional network element to an optical fiber amplifier together with the optical data signals which, apart from the amplification, pass the amplifier unchanged. In a quite similar manner, control and monitor signals may be transferred from the fiber amplifier to a subsequent traditional network element, and this is described below.

The control unit 30 applies control and monitor signals 31, which may also be formed by bytes corresponding to D1–D12, quite as if a traditional regenerator was involved. The signals 31 are converted in the optical transmitter unit 32 into an optical signal 33. If the demultiplexer 24 has removed at any rate the greater part of light having the wavelength of the signals 19 and 25 from the optical signal 27, only a small part of this wavelength remains in the signal 28, and this wavelength may thus be used again for the optical signal 33. Otherwise, a new wavelength must be used. The optical signals 28 and 33 are mixed in an optical multiplexer 34 to form the optical signal 35 in the same manner as has already been described for FIG. 3, said signal 35 being transmitted on the fiber which leads to the receiver part of a traditional network element or optionally to another optical fiber amplifier.

Figure 5:
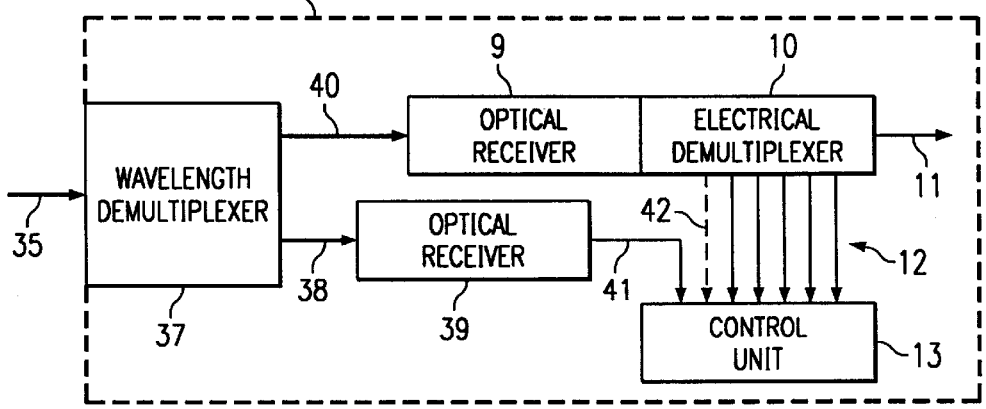
FIG. 5 shows an input part of a network element according to a first embodiment of the invention.

FIG. 5 shows the modified input part 36 of an otherwise traditional network element. Here, too, the optical signal 35 from the fiber first passes an optical demultiplexer 37, which splits it so that light having a wavelength corresponding to the wavelength of the optical signal 33 in FIG. 4 is fed as the optical signal 38 to an optical receiver unit 39, while other wavelengths are fed as the optical signal 40 to the optical receiver unit 9, in which it is converted into electrical signals, which are split in the demultiplexer 10 into the data signals 11 and the control and monitor signals 12 for the control unit 13, as was described above for FIG. 2.

The optical signal 38 is converted in the optical receiver unit 39 into electrical control and monitor signals 41, e.g. in the form of the previously described bytes D1–D12 which are fed to the control unit 13, which is now also capable of receiving such signals from an inserted fiber amplifier.

It should be noted that if, as shown in FIG. 3, the D1–D12 signals for this network element have been fed as the signals 16 and 17 to the optical transmitter unit 15 and the multiplexer 2, respectively, the D1–D12 bytes originating from this will still be present in the signal which is demultiplexed in the demultiplexer 10, and they may then be fed as the signals 42 to the control unit 13. This will thus be capable of receiving D1–D12 bytes from the preceding traditional network element as well as from an inserted optical fiber amplifier.

Figure 6:
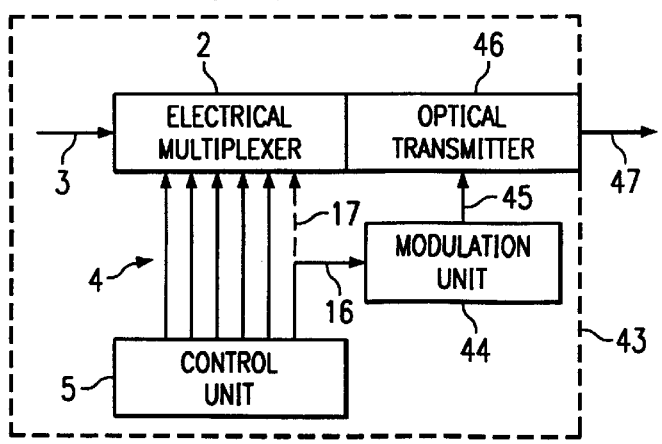
FIG. 6 shows an output part of a network element according to a second embodiment of the invention.
Figure 7:
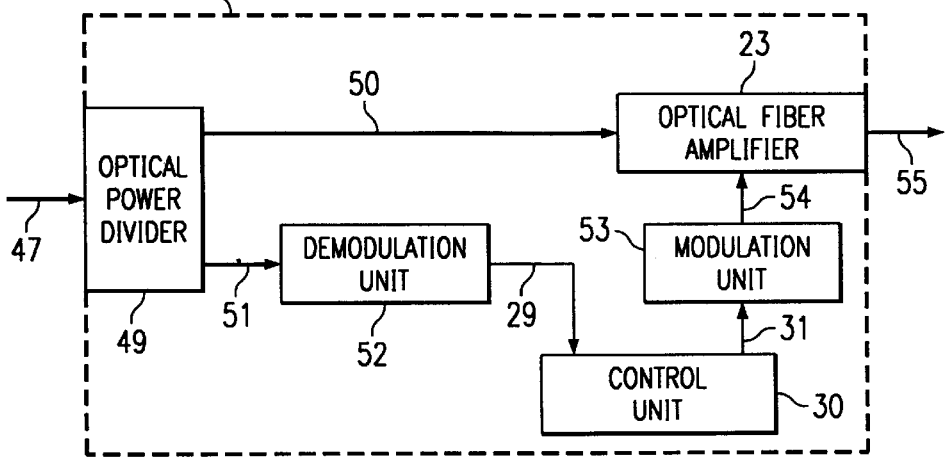
FIG. 7 shows an optical amplifier unit according to a second embodiment of the invention.
Figure 8:
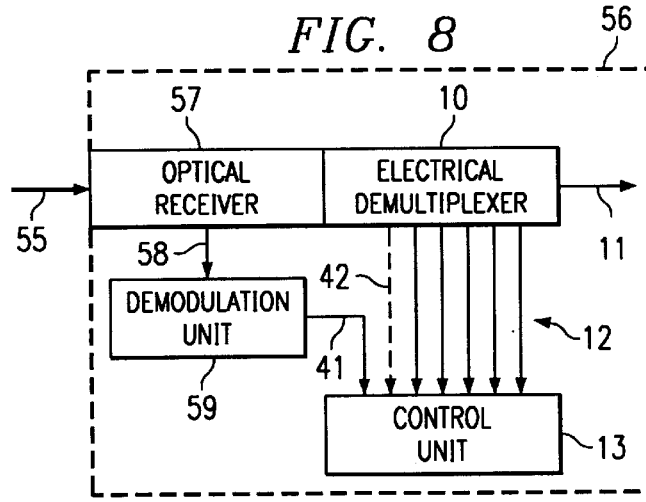
FIG. 8 shows an input part of a network element according to a second embodiment of the invention.

An alternative embodiment of the invention is shown in FIGS. 6–8. In the embodiment described above, the control and monitor signals are transferred to and from the optical amplifier by means of light having another wavelength than the one or ones used for the other data signals. In FIGS. 6–8, the control and monitor signals are transferred instead by modulating the already occurring wavelengths.

The output part 43 shown in FIG. 6 for a terminal multiplexer corresponds to the output part 14 in FIG. 3, but is modified in a number of respects. The control and monitor signals 16, which may be the above-mentioned bytes D1–D12 in an SDH system, as mentioned, and which are to be transferred to the fiber amplifier, are now fed to a modulation circuit 44 instead, in which they are converted into a modulation signal 45. In the optical transmitter unit 46, in which the electrical signals are converted into optical signals 47 as described before, the modulation signal 45 is used for modulating these optical signals. This may take place e.g. by amplitude modulation, and the principle is also called subcarrier multiplexing.

FIG. 7 correspondingly shows a modified optical amplifier unit 48. Here, the modulated optical signal 47 first passes an optical power divider 49, in which it is split into two optical signals 50 and 51, both of which correspond to the signal 47, but are just weaker. Typically, the power division takes place such that most of the power is fed to the signal 50, which is the signal proper, while the signal 51 just constitutes a small part of the power, since this is merely to be used for demodulating the modulated control signals. This takes place in the demodulation unit 52, which recreates the electrical control and monitor signal 29, which, like before, corresponds to the signal 16 in FIG. 6 and is fed to the local control unit 30. The optical signal 50 is fed directly to the optical fiber amplifier 23 itself, which amplifies the signal purely optically, like before.

The control and monitor signals 31, which are emitted by the control unit 30 and are to be transferred to a subsequent traditional network element, are here fed to a modulation circuit 53 in which they are converted into a modulation signal 54. The modulation signal 54 is used for modulating the gain of the optical fiber amplifier in which the optical signals 50 are amplified, so that the control and monitor signals are modulated on the optical output signal 55 in the same manner as for the signal 47 in FIG. 6. The modulation in the fiber amplifier may take place by modulating the pump laser current.

FIG. 8 shows an example of an input part 56 of a traditional network element corresponding thereto. The optical signal 55 is received here in the optical receiver unit 57, in which it is converted into an electrical signal which, on one hand, is further processed in the demultiplexer 10, like before, and, on the other hand, is fed as the signal 58 to the demodulation circuit 59. The demodulation that takes place in this circuit, creates the control and monitor signals 51, which have been described before. Alternatively, the same principle may be used in the input part as in the amplifier unit in FIG. 7, where the optical signal is split in an optical power divider into two signals, which are then processed separately. However, this solution is less expedient here, as it results in a power loss for the optical signal.

The non-mentioned parts of FIGS. 6–8 are unchanged and have the same function in relation to FIGS. 3–5.

Figure 9:
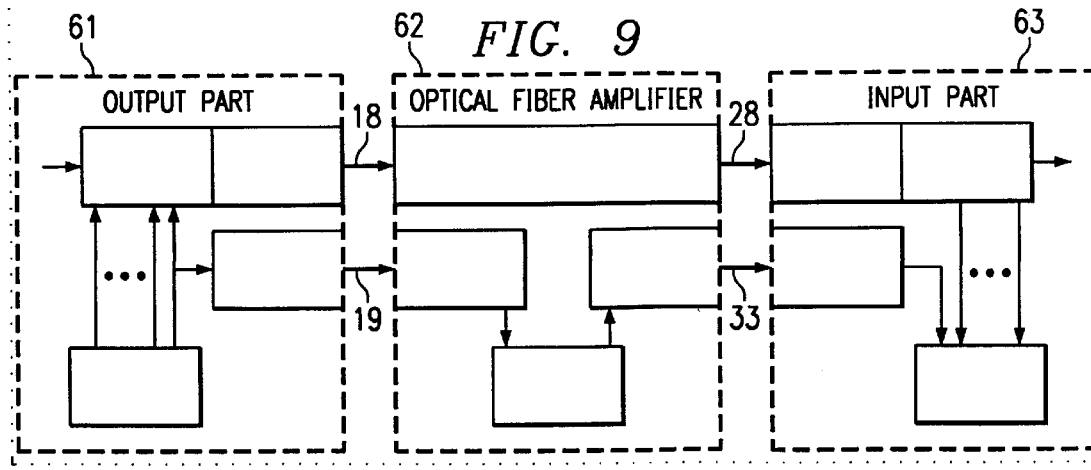
FIG. 9 shows a third embodiment of the invention.

Finally, FIG. 9 shows a third embodiment using separate fibers for transferring the control and monitor signals to and from the optical fiber amplifier. The constituent components are the same as in FIGS. 3–5. The optical signals 18 and 19 are here transmitted from the output part 61 on their respective fibers to the fiber amplifier 62 instead of being mixed to form a single signal 21 in the optical wavelength multiplexer 20 like before. Therefore, the amplifier unit 62 receives the two signals independently of each other from their respective fibers, and the wavelength demultiplexer 24 from FIG. 4 may thus be omitted. Similarly, the optical signals 28 and 33 are transmitted on their respective fibers from the amplifier unit 62 to the input part 63. Otherwise, the circuits operate as described before.

A variant of this embodiment occurs where e.g. a fiber connection uses a cable having several fibers into each of which fiber amplifiers may be inserted en route. Thus, an amplifier unit may contain a fiber amplifier for each fiber. In this situation, it may be expedient that the control and monitor signals from all the fiber amplifiers in an amplifier unit are transferred on one and the same fiber, which may either be a separate fiber for this purpose or one of the other fibers, it being possible to multiplex the signals into the fiber together with its other signals by means of one of the methods described above.

Although a preferred embodiment of the present invention has been described and illustrated, the invention is not restricted to this, but may also be embodied in other ways within the scope of the subject-matter defined in the following claims.

What is claimed is:

1. A method for transmitting signals over an optical fiber link, comprising:
   receiving a plurality of data signals;
   generating a plurality of first control and monitor signals;
   combining the plurality of first control and monitor signals with the plurality of data signals;
   converting the combined control and monitor signals and data signals into a first plurality of optical signals;
   generating a plurality of second control and monitor signals;
   inserting the plurality of second control and monitoring signals into the first plurality of optical signals.

2. The method of claim 1, further comprising:
   converting the plurality of second control and monitor signals into a modulating signal;
   modulating the first plurality of optical signals according to the modulating signal.

3. The method of claim 2, further comprising:
   transferring the plurality of second control and monitor signals in the modulation of the first plurality of optical signals.

4. The method of claim 2, wherein the first plurality of optical signals are amplitude modulated.

5. The method of claim 1, further comprising:
   converting the plurality of second control and monitor signals into a second plurality of optical signals;
   mixing the second plurality of optical signals with the first plurality of optical signals.

6. The method of claim 5, wherein the second plurality of optical signals has a different wavelength than the first plurality of optical signals.

7. The method of claim 5, further comprising;
   transmitting a third plurality of optical signals, the third plurality of optical signals including a mixture of the second plurality of optical signals and the first plurality of optical signals.

8. The method of claim 1, wherein the plurality of second control and monitor signals are based on overhead bytes used in Synchronous Digital Hierarchy signals.

9. The method of claim 8, wherein the plurality of second control and monitor signals are D1–D12 bytes of Synchronous Digital Hierarchy signals.

10. The method of claim 1, further comprising:
    combining the plurality of second control and monitor signals with the plurality of first control and monitor signals and the plurality of data signals.

11. An apparatus for transmitting signals over a fiber link, comprising:
    means for receiving a plurality of data signals;
    means for generating a plurality of first control and monitor signals;
    means for combining the plurality of control and monitor signals with the plurality of data signals;
    means for converting the combined control and monitor signals and data signals into a first plurality of optical signals;
    means for generating a plurality of second control and monitor signals;
    means for inserting the plurality of second control and monitoring signals into the first plurality of optical signals.

12. The apparatus of claim 11, wherein the means for inserting includes:
  means for converting the plurality of second control and monitor signals into a modulating signal;
  means for modulating the first plurality of optical signals according to the modulating signal.

13. The apparatus of claim 12, wherein the plurality of second control and monitor signals are carried in the modulation of the first plurality of optical signals.

14. The apparatus of claim 11, wherein the means for inserting includes:
  means for converting the plurality of second control and monitor signals into a second plurality of optical signals;
  means for mixing the second plurality of optical signals with the first plurality of optical signals.

15. The apparatus of claim 14, wherein the second plurality of optical signals have different wavelengths than any of the first plurality of optical signals.

16. An apparatus for transmitting signals over an optical fiber link, comprising:
  a control unit operable to generate a plurality of first control and monitor signals and a plurality of second control and monitor signals;
  a multiplexer operable to receive a plurality of data signals, the multiplexer operable to combine the plurality of first control and monitor signals with the plurality of data signals;
  a first optical transmitter unit operable to convert the combined plurality of first control and monitor signals and plurality of data signals into a first plurality of optical signals;
  a second optical transmitter unit operable to convert the plurality of second control and monitor signals into a second plurality of optical signals;
  an optical wavelength multiplexer operable to combine the first plurality of optical signals and the second plurality of optical signals into a third plurality of optical signals.

17. The apparatus of claim 16, wherein the first plurality of optical signals and the second plurality of optical signals have different wavelengths.

18. An apparatus for transmitting signals over an optical fiber link, comprising:
  a control unit operable to generate a plurality of first control and monitor signals and a plurality of second control and monitor signals;
  a multiplexer operable to receive a plurality of data signals, the multiplexer operable to combine the plurality of first control and monitor signals with the plurality of data signals;
  a modulator operable to generate a modulating signal in response to the plurality of second control and monitor signals;
  an optical transmitter unit operable to convert the combined plurality of first control and monitor signals and plurality of data signals into a plurality of optical signals, the optical transmitter unit operable to modulate the plurality of optical signals according to the modulating signal.

19. The apparatus of claim 18, wherein the plurality of second control and monitor signals are carried in the modulation of the plurality of optical signals.

* * * * *